United States Patent [19]

Hirose

[11] Patent Number: 4,627,303

[45] Date of Patent: Dec. 9, 1986

[54] VARIABLE RESISTANCE DEVICE

[75] Inventor: Masashi Hirose, Iruma, Japan

[73] Assignee: Copal Electronics Co., Ltd., Tokyo, Japan

[21] Appl. No.: 637,535

[22] Filed: Aug. 3, 1984

[30] Foreign Application Priority Data

Aug. 4, 1983 [JP] Japan ............................... 58-140709

[51] Int. Cl.$^{4}$ .......................... F16H 1/16; F16H 1/20; F16H 57/00; H01C 10/34

[52] U.S. Cl. ....................................... 74/425; 74/405; 338/174

[58] Field of Search .................. 74/425, 405; 338/162, 338/174

[56] References Cited

U.S. PATENT DOCUMENTS

| | | | |
|---|---|---|---|
| 3,099,810 | 7/1963 | Habereder | 338/174 |
| 3,115,614 | 12/1963 | Habereder | 74/425 |
| 3,218,527 | 11/1965 | Miller | 74/425 |
| 3,242,452 | 3/1966 | Grunwald et al. | 338/174 |
| 3,446,085 | 5/1969 | Ginsberg | 74/425 |
| 3,768,325 | 10/1973 | Kucharski, Jr. | 74/405 |
| 4,004,264 | 1/1977 | Hogue et al. | 338/162 |
| 4,357,591 | 11/1982 | Gray | 338/162 |
| 4,427,966 | 1/1984 | Gratzinger et al. | 338/162 |

*Primary Examiner*—Kenneth J. Dorner
*Assistant Examiner*—Mike Bednarek
*Attorney, Agent, or Firm*—Wenderoth, Lind and Ponack

[57] ABSTRACT

A worm gear-actuated variable resistance device including a clutch structure, having a worm gear actuated by a worm screw. The worm gear has a toothless sector, and the teeth are engagable by the thread of the screw to rotate the gear to a position in which the screw opposes the toothless sector. The gear is mounted in a housing having a resistive element and a conductive element fixed thereto. The gear has a resilient finger having a stop member thereon which is slidable in a channel in the housing when the gear rotates. The toothless sector and stop member are so arranged relative to the channel in the housing that when the gear rotates in one direction out of contact with the screw, the stop abuts an end surface of the channel which deforms the resilient finger so as to bias the gear in a direction opposite the original turning direction of the gear, thereby to enable the teeth of the gear to reengage with the screw when the screw is rotated in a direction opposite to the direction corresponding to the original rotational direction of the gear to enable rotation of the worm gear to be reversed.

7 Claims, 14 Drawing Figures

VARIABLE RESISTANCE DEVICE

BACKGROUND AND BRIEF SUMMARY OF THE INVENTION

This invention relates to the field of variable resistance devices, and more particularly to a clutch means for worm gear actuated multiple turn resistors.

In some of the prior art device (U.S. Pat. No. 3,242,452, patented March, 1966, issued to A. A. Grunwald et al), a contact supporting member is rotatably mounted in a housing and is provided with teeth and a toothless section on its periphery. There is also a U-shaped slot provided in one side of the toothless section, the teeth being arranged to engage the screwthread on a lead screw so that the rotation of the lead screw will rotate the contact supporting member. A resilient means disposed in the U-shaped slot of the toothless section comprises a U-shaped spring having two legs and a bight section with the legs extending outwardly from the member and in position to engage the thread on the lead screw as the member is rotated.

A stop means is also arranged to limit the rotation of the member in either direction when one of the legs of the U-shaped spring engages the thread of the lead screw, the portion intermediate the legs of the U-shaped slot forming a stop member for limiting flexure of the legs of the spring toward each other from an unflexed position.

Another prior art device is describe in U.S. Pat. No. 3,768,325 dated Oct. 30, 1973 in which a ratcheting mechanism for use in a worm gear actuated potentiometer, utilizes a worm gear having a circumferential portion of the teeth thereof removed, i.e. a blank area, a worm screw having threads for engaging the teeth of the worm gear, and a ratcheting structure including a stop member and a resilient member. One of the two ratcheting structure members is attached to a housing or other unmovable structure and the other is attached to the worm gear at locations such that the resilient member will engage the stop member whenever the threads of the worm screw engage a tooth of the worm gear adjacent the blank area so as to provide ratcheting.

While such prior art structures have their own merit to overcome the disadvantages of typical clutch mechanism they have also a disadvantage in that they require a separate stop mechanism in addition to a ratcheting mechanism or clutch means, which brings forth complexities in the structure thereof; the ratcheting mechanism or clutch means is somewhat unreliable and unpredictable practically after repeated usage, due to the use of strip shaped resilient member; and the device may be difficult and expensive to manufacture.

SUMMARY OF THE INVENTION

It is an object of this invention to provide an improved clutch means for worm gear actuated multiple turn variable resistors.

Another object of this invention is to provide a clutch means for a worm gear actuated multiple turn variable resistor, which is not equipped with a separate resilient ratcheting member as found in the prior art but rather is equipped with a finger-like resilient projection which functions as a clutch means with the combination of an arcuate groove disposed underneath the housing.

The above mentioned objects may be satisfied in the present invention in which the clutch means includes a worm gear having a portion of the teeth cut away to form a blank area, a finger-like resilient projection member extending in and along an elongated groove disposed in a rotor gear, and a stopper attached or arranged integrally on top end of the finger, which protrudes upwardly into an arcuated groove disposed underneath a housing.

The locations of the three members are such that when the tooth adjacent the blank area on the worm gear disengages the teeth or threads of the worm screw, the rotation of the worm gear is stopped whenever the stopper arranged on the resilient finger-like projection slides to touch one end wall of the arcuated groove disposed in the housing and biases this tooth back toward the threads to permit the worm screw thread to engage the teeth of worm gear if the direction of rotation of the worm screw is reversed.

BRIEF DESCRIPTION OF THE DRAWINGS

The present invention, however, together with further objects and advantages thereof, may best be understood by reference to the following description taken in connection with the accompanying drawings in which.

DETAIL DESCRIPTION OF THE INVENTION

The invention will now be described in detail, making reference to the accompanying drawings.

Figure 1:
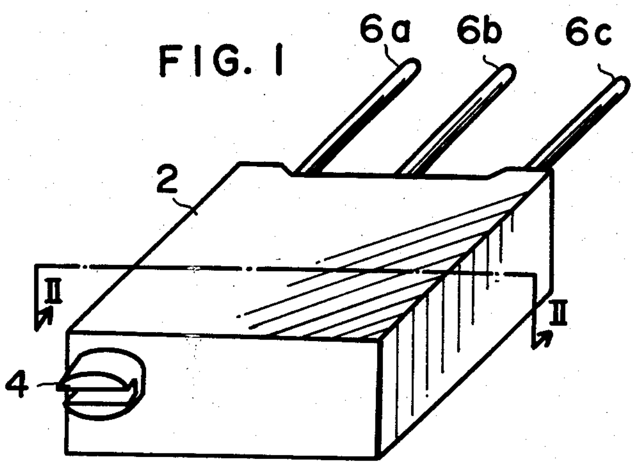
FIG. 1 is a perspective view of a multiple turn variable resistor.
Figure 2:
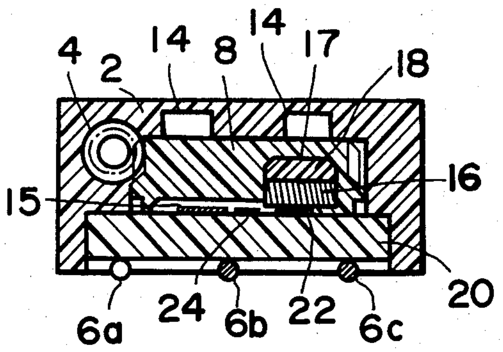
FIG. 2 is a cross-sectional view of the variable resistor seen along the line II—II of FIG. 1.
Figure 3:
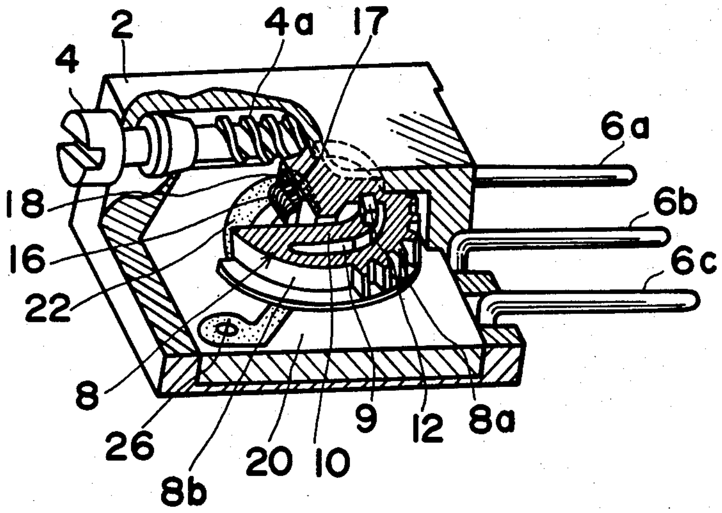
FIG. 3 is an exploded isometric view partially in section showing the interior of the variable resistor with a housing and a rotor gear being taken away partially.

As shown in FIGS. 1, 2 and 3, a generally disc shaped rotor gear (worm gear) 8 and a worm screw 4 having the thread **4*a* engageable with the teeth 8*a* of the rotor gear 8 are arranged inside of a housing 2. The rotor gear 8 is formed or provided at its lower face with a shallow circular recess 15 and a deeper recess or pocket 17** which is trapezoidal in section.

Disposed in the pocket 17 and held captive by a silicon rubber pad 18 is a helical spring wiper 16 forming an electrical contact member. The spring wiper 16 extends radially to contact a resistance element 22 and a conductor element 24 arranged on a base 20 by spanning both of the elements 22 and 24.

Figure 8:
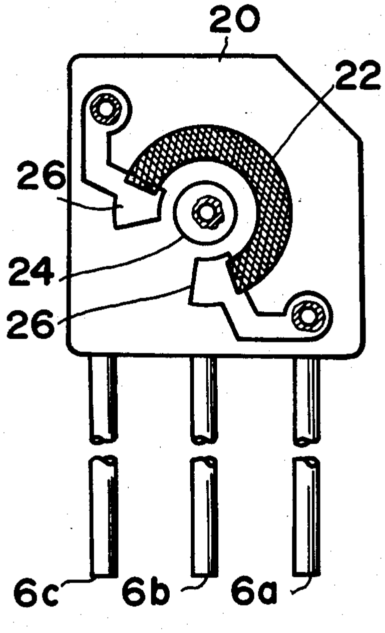
FIG. 8 is a plan view of a base.

Referring to FIG. 8, the resistance element 22 is preferably a metal material in the form of an annulus with the ends thereof being connecting to strips 26 of highly conductive material to which pin terminals **6*a* and 6*c* are connected by connection means, while conductor element is electrically connected to pin terminal 6*b***.

The worm gear 8 is preferably formed of a plastic material.

Figure 4:
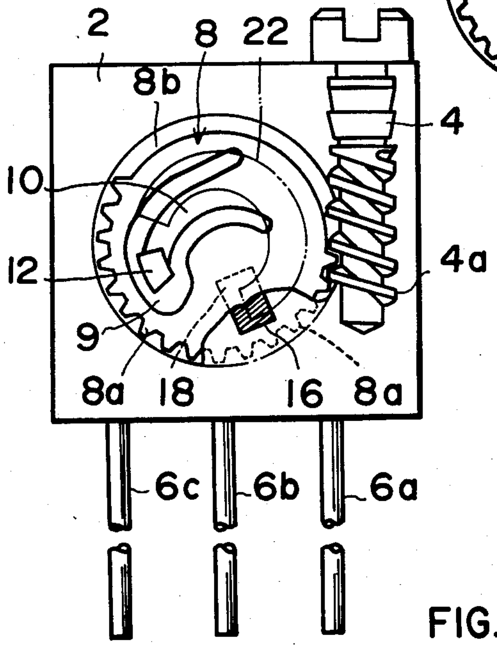
FIG. 4 is a plan view of a worm screw and a rotor gear with a housing partially cut away.

A clutch means of the invention is formed of a groove or channel 14 in housing Z and a resilient projection 10 having a stopper 12 on the top thereof, formed in an arcuate slit 9 in the worm gear 8, as illustrated best in FIGS. 3 and 4.

Figure 7:
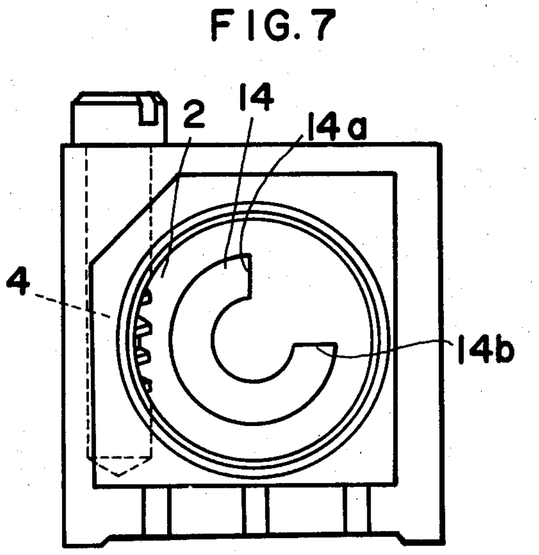
FIG. 7 is a plan view of a housing showing an arcuate groove engraved therein.

In the housing 2 the arcuated groove or channel 14 opening toward the worm gear 8 is disposed as shown in FIGS. 2 and 7. The both ends of the groove are in the form of vertical walls 14*a* and 14*b* which will function to withhold a further shifting of the stopper 12 positioned on the top of the finger-like resilient projection 10, as will be explained hereinafter, when the finger-like resilient projection 10 is arcuately slides in and along the housing groove 14 when the worm screw teeth 4*a* rotates the worm gear 8 in engagement with worm gear teeth 8*a*.

Figure 5A:
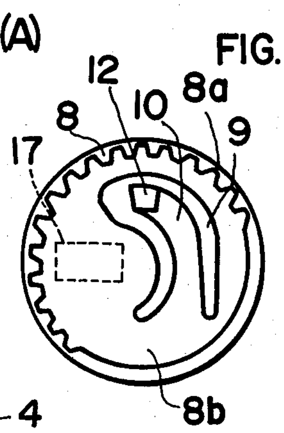
FIG. 5(A) is a plan view of a rotor gear equipped with a projection of finger-like resilient member.
Figure 5B:
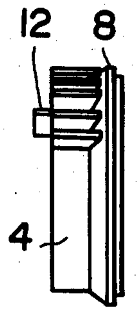
FIG. 5(B) is a side view of the gear rotor shown in FIG. 5(A)

FIGS. 5A and 5B further illustrates a plan view of the worm gear 8 which has a plurality of teeth 8*a* regularly spaced around the circumference thereof with the exception of blank area 8*b*. The arcuate slit 9 disposed in the worm gear 8 extends from the blank area 8*b* circumferentially in the direction to the plurality of thread 8*a* and return back toward the blank area 8*b*, thus having a shape like the outline of a sole of a shoe.

Within the outline of the slit 9 a curved finger-like resilient projection 10 is formed integrally with the gear 8. To the top of the free end of the projection 10 is fixed to a stopper or stop 12. The slit 9 permits a degree of bending of projection 10 in the plane of worm gear 8.

Figure 6A:
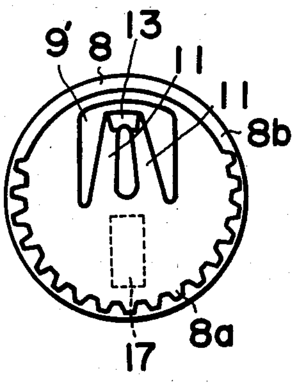
FIG. 6(A) is a plan view of a rotor gear and a worm screw of another embodiment.
Figure 6B:
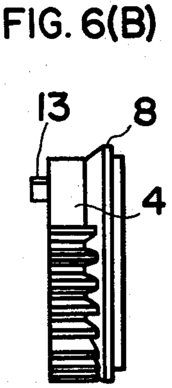
FIG. 6(B) is a side view of the embodiment shown in FIG. 6(A)

FIGS. 6(A) and 6(B) illustrate another embodiment of gear 8 having a differently shaped slit 9' and a finger-like resilient projection 11 on which a stopper or stop 13 is fixed. This embodiment otherwise has the same efficiency and operation as the proceding embodiment and accordingly a detailed explanation is omitted.

FIG. 8 is a plan view of the base 20 on which is arranged the arcuate resistance element 22. Through terminal strips 26 and the central terminal formed of conductor 24, pin terminals 6*a*, 6*b* and 6*c* are electrically connected to the base 20.

Referring to FIGS. 9(A), 9(B), 9(C) and 9(D) the operation of the mechanism of the present invention will now be explained.

Figure 9A:
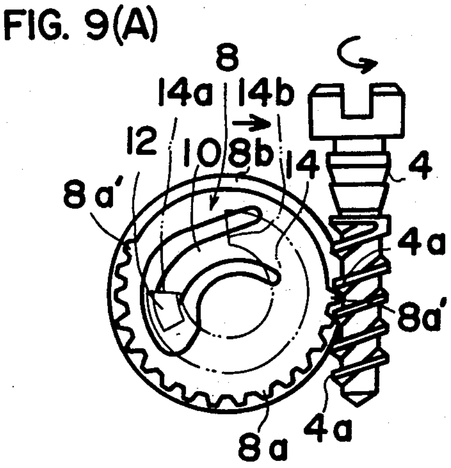
FIGS. 9(A), 9(B), 9(C) and 9(D) show an outline sketch of a clutch machanism formed of a worm screw and a rotor gear, in different stages of operation.
Figure 9B:
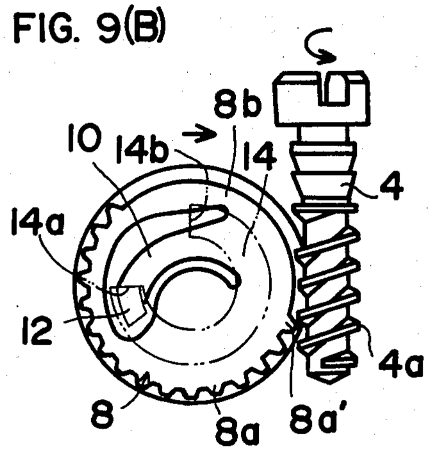
Figure 9C:
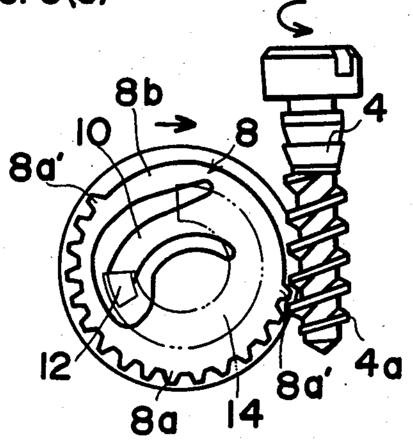

As shown in FIGS. 9(A), when the worm screw 4 is rotated counterclockwise as shown by an arrow, by applying a driver in the worm screw, and the gear 8 is also rotated in the direction as shown by an arrow, threads 4*a* of the worm screw 4 and the teeth 8*a* of the gear 8 engage with each other and turn simultaneously with the rotation of the gear 8, and the helical coil wiper 16 held firmly by the silicon rubber pad 18, both being arranged in the recess or pocket 17 of the gear 8, slides along the arcuate resistance element 22 and conductor element 24 and reaches the edge thereof, thereby to change the resistance value between appropriate pin terminals. With such continued rotation of gear 8, the stopper 12 on projection 10 in groove 14 slides along the arcuate groove 14 until the stopper 12 is rotated to abut the side wall 14*a* of the groove 14. The gear tooth 8*a'* immediately adjacent the blank area 8*b* is also engaged with one of the teeth 4*a* of the worm screw 4. Further rotation of worm screw 4 in the same direction, as shown in FIGS. 9(B) and 9(C) brings forth a further rotation of the worm gear 8 in an arrow direction with its edge tooth 8*a'* engaging with one of the worm screw teeth 4*a*, whereby with the stopper 12 abutting wall 14*a*, the resilient projection 10 is warped or deformed as shown in FIG. 9(B), resulting from the force exerted by the worm screw 4 and the worm gear 8.

If the counter-clockwise rotation of the worm screw 4 is thus continued, the engagement of the worm screw thread 4*a* with the tooth 8*a'* of the worm gear 8 will finally be released. This allows worm screw 4 to continue to rotate in the same direction without causing the rotation of worm gear 8, and due to the repulsion force on the finger-like resilient projection 10 which is resiliently warped in contact with the wall 14*a*, the gear 8 tends to be rotated in a reverse direction as shown by dotted line in FIG. 9(C), whereby the rotation of the gear 8 comes to a stop. Simultaneously, the helical coil spring 16 stops sliding along the resistance element 22 and conductor element 24.

Figure 9D:
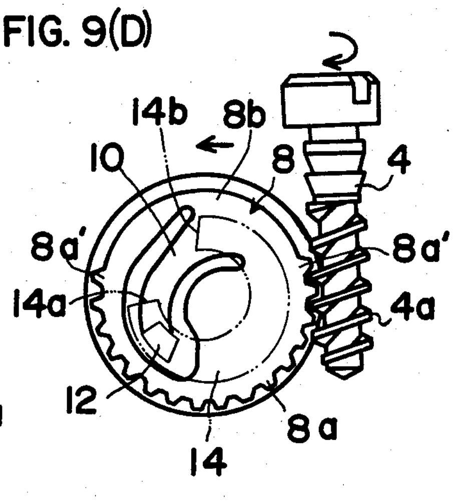

However, as shown in FIG. 9(D), whenever the worm screw 4 begins to be rotated clockwise, the gear 8 will rotate counter-clockwise by engaging its teeth 8*a* with thread 4*a* of the worm screw 4 until the stopper 12 disposed on the finger-like resilient projection 10 shifts slidably along groove 14 counter-clockwise to finally abut against the inner vertical wall 14*b* thereof to be stopped thereat.

Thus, the helical coil wiper 16 may, as described above, be able to slide along forward or backward on the arcuate resistance element 22 in accordance with clockwise or counter-clockwise rotation of the worm gear 8 with the cooperation of worm screw 4.

The clutch means of this invention is simple in structure and efficiently designed such that the stopper disposed on the resilient finger-like projection shifts along the arcuate groove defined in the housing and stops against end walls of the arcuate grooves by the operation of the worm gear and the worm screw, whereby the coil spring wiper simultaneously slides along the resistance element to be stopped in accordance with the movement of the worm gear and the worm screw.

What I claim is:

1. A variable resistance device, comprising:

a resistive element and a conductive element;

a contact member in movable contact with said resistive and conductive elements;

and means for moving one of said contact member, and said resistive and conductive elements, relative to the other, said means including

- a worm screw having thread, rotatable about a worm screw axis in opposite directions,
- a worm gear, rotatable in opposite directions about a worm gear axis, having a periphery surrounding said worm gear axis and gear teeth along said periphery except a toothless sector devoid of gear teeth, said teeth being engaged by said thread such that rotation of said screw rotates said gear in a corresponding direction about said worm gear axis, said gear being rotatable by said screw to a position in which said screw opposes said toothless sector and is out of engagement with said teeth, a housing, said gear being mounted in said housing, a resilient finger resiliently fixed to and carried by said gear, said gear having a stop member thereon, and channel means defining an arcuate channel formed in said housing, said channel having opposite end surfaces formed in said housing, said resilient finger being fixed to said gear, said gear being rotatively moveable relative to said channel means, said stop projecting into said channel and being relatively moveable therein between said end surfaces with rotation of said gear about said worm gear axis such that when said gear rotates in one direction corresponding to a corresponding rotational direction of said screw, out of engagement with said screw with said toothless sector opposing said threads, said stop abuts one of said end surfaces and said one end surface resiliently deforms said finger so as to bias said gear in a direction opposite said one direction so as to enable said teeth to re-engage said screw when said screw is rotated oppositely to the direction corresponding to said one direction of rotation of said gear.

2. A variable resistance device as in claim 1, wherein said gear is formed in a plane and is generally disc-shaped and has a groove extending therethrough arcuately formed in said plane of said gear so as to surround a finger-shaped portion of said gear, said portion forming said finger integral with said gear, said finger being bendable in said groove in said plane of said gear.

3. A variable resistance device as in claim 2, wherein said finger is curved in said plane of said gear.

4. A variable resistance device as in claim 3, wherein said groove is in the shape of an outline of a sole of a shoe.

5. A variable resistance device as in claim 2, wherein said finger is triangular and has an apex pointing toward said toothless sector of said gear.

6. A variable resistance device as in claim 1 wherein, one of said contact member, and said resistive and conductive elements is fixed to said housing and the other is fixed to said gear for rotation therewith.

7. A variable resistance device as in claim 1 wherein said contact member is fixed to said gear for rotation therewith and said resistive and conductive elements are fixed to said housing.

* * * * *